United States Patent [19]

Levallois et al.

[11] Patent Number: 4,591,293

[45] Date of Patent: May 27, 1986

[54] METHOD AND DEVICE FOR PLACING IN A DETERMINED RELATIVE POSITION TWO ELEMENTS SUBMERGED IN A CONDUCTING LIQUID MEDIUM

[75] Inventors: Emile Levallois, Courbevoie; Rene Szabo, Le Pecq; Jean Clot, Saint-Orens; Daniel Esteve, Ramonville, all of France

[73] Assignee: Institut Francais du Petrole, Rueil-Malmaison, France

[21] Appl. No.: 645,146

[22] Filed: Aug. 28, 1984

Related U.S. Application Data

[63] Continuation-in-part of Ser. No. 444,297, Nov. 24, 1982, Pat. No. 4,468,155.

[30] Foreign Application Priority Data

Nov. 24, 1981 [FR] France ................................ 81 21935

[51] Int. Cl.[4] .............................................. F16L 1/04
[52] U.S. Cl. ..................................... 405/170; 405/195; 405/169; 166/341; 340/852; 33/180 R
[58] Field of Search ............... 405/168, 169, 170, 171, 405/195, 188, 158; 166/338–343; 340/852, 870.38; 33/180 R, 181 R; 73/634, 628, 620

[56] References Cited

U.S. PATENT DOCUMENTS

| | | | |
|---|---|---|---|
| 3,336,572 | 8/1967 | Paull et al. ...................... | 166/341 X |
| 3,458,853 | 7/1969 | Daniels et al. .................. | 166/341 X |
| 3,497,869 | 2/1970 | Silverman ....................... | 340/852 |
| 4,120,095 | 10/1978 | Lebourg ......................... | 405/170 X |
| 4,140,991 | 2/1979 | Sigleton et al. ................ | 340/852 |
| 4,148,013 | 4/1979 | Finn et al. ..................... | 340/870.38 X |
| 4,214,842 | 7/1980 | Franks ........................... | 166/341 X |
| 4,287,769 | 9/1981 | Buckley ......................... | 73/628 X |
| 4,317,174 | 2/1982 | Dean ............................. | 405/195 X |
| 4,528,757 | 7/1985 | McKeehan et al. ........... | 33/180 R X |
| 4,537,075 | 8/1985 | Jackson et al. ................ | 73/634 |

*Primary Examiner*—Dennis L. Taylor
*Attorney, Agent, or Firm*—Millen & White

[57] ABSTRACT

A device for permitting the relatively precise positioning of two geometrical axes respectively of two elements at least one of the elements being associated with means capable of assuring its displacement characterized in that it comprises in combination at least two acoustic emitters-receivers disposed in a first plane substantially perpendicular to one of said geometrical axes, said axis being defined as the first axis, and capable of emitting toward said axis, said two emitter-receivers not being located on a same line passing through said first axis and in that it comprises a third emitter-receiver situated outside of said plane.

12 Claims, 16 Drawing Figures

METHOD AND DEVICE FOR PLACING IN A DETERMINED RELATIVE POSITION TWO ELEMENTS SUBMERGED IN A CONDUCTING LIQUID MEDIUM

This application is a continuation-in-part of application Ser. No. 444,297, filed Nov. 24, 1982, now U.S. Pat. No. 4,468,155.

The present invention which has been effected in cooperation with "Coflexip" and the "Laboratoire d'Automatique et d'Analyse des Systemes", concerns a method and a device for placing in a determined relative position two elements eventually submerged in a conducting liquid medium.

During operations conducted on the sea bottom, it may be desirable, for example, to place two distinct elements in a determined relative position, in order, particularly, to effect their tie-in (See French Pat. No. 2,136,291). These elements may be two pipes which have to be fastened end to end by means of a connector, or a pipe and a submerged structure such as a well or a submerged collector of the oil manifold type, etc. . . .

These operations, already difficult to conduct when effected under the direct control of divers, raise problems when using "robots" equipped with at least one television camera and lighting material. In this case, the operator, at the surface, visually controls the assembling operations and, in accordance controls the actuation of the manipulator arms of the robot.

This solution, in addition to its high cost, suffers disadvantages resulting from the relatively small size of the space visually controlled by the operator. As a matter of fact, the lighting provides at most for a view field of only a few meters in diameter and, even frequently, not larger than two meters. Moreover, this view field is often darkened by loose sediments from the sea bottom which are stirred by the water motion resulting from the displacement of the parts to be assembled. In certain cases, the view field is non-existent. Finally, the accuracy of the assembling is limited by the fact that, in most cases, only a two-dimensional image is available for the visual control by the operator.

In order to limit these disadvantages, locating systems have been proposed which make use of at least one acoustic emitter-receiver, rigidly secured to one of the elements to be assembled, the other element being provided with acoustic transponders (British Pat. No. 1,597,378 and No. 2,034,471). By this way it is possible to bring closer to each other the two elements to be assembled, but not to effect a sufficiently accurate positioning of these elements to obtain entirely safe mechanical connections required for certain connectors.

It could also be considered to determine the relative position of the two elements from the measurement of the capacitance effect, but this measurement is not possible in a conducting medium, and cannot be used in the considered case. An alternative embodiment of this prior technique is described in the U.S. Pat. No. 3,497,869.

The present invention makes it possible to effect the relatively precise positioning of two geometrical axes apertaining respectively to two elements by a method and an apparatus of simple design, at relatively low cost and without the disadvantages of the prior devices.

The device, according to the invention, permits the relatively precise positioning of two geometrical axes apertaining respectively to two elements at least one of the elements being associated with means capable of insuring its displacement. The device according to the invention is characterized in that it comprises in combination at least two acoustic emitter-receivers disposed in a first plane substantially perpendicular to one of said geometrical axes, (said axis being defined as the first axis), and emitting toward said axis, said two emitter-receivers not being situated on a same line passing through said first axis, and in that it comprises a third emitter-receiver situated outside all said planes.

The device according to the invention can comprise a fourth emitter-receiver situated substantially in a second plane perpendicular to the first axis and passing through the third emitter-receiver.

It will not depart from the scope of the present invention if at least one of the emitter-receivers is disposed on a solid rod or reed of one of said elements.

The device according to the invention can be applied in the case where the element having said first geometrical axis has the form of a cylinder of revolution where said first axis coincides with the axis of revolution. The emitter-receivers can be located in the interior of the space defined by the element having a cylindrical shape at two vertical planes tangent to the cylinder.

The device according to the invention can be completed by other means, so-called adjusting means, which permit a first non-precise approach or gross approach between the two elements. In the particular case where the two elements are placed in a liquid conducting medium, said means can comprise:

a first assembly of electrodes rigidly secured to a first of said elements and arranged according to a geometrical configuration whereby at least one point of the axis of said element can be defined, a second assembly of electrodes rigidly secured to the second element and arranged according a geometrical configuration whereby at least one point of the axis of said element can be defined, a source of electric voltage having one output terminal electrically connected to the electrodes of one of the assemblies and the other terminal electrically connected to the electrodes of the other assembly, means for measuring values of a parameter in relation with electric currents passing through the electrodes of one of the assemblies, a first group of acoustic members, rigidly secured to one of these elements, and arranged according to a geometrical configuration whereby at least one point of the axis of said element can be defined, a second group of acoustic members, rigidly secured to the other element, and arranged according to a geometrical configuration whereby at least one point of the axis of said element can be defined, the acoustic members of at least one of said groups being adapted to emit acoustic waves, means for measuring a quantity characteristic of the propagation of the acoustic waves between the acoustic members of the two groups.

According to one embodiment, the means for measuring the values of said parameter in relation with the electric currents and the means for measuring the quantity characteristic of the propagation of the acoustic waves, are adapted to deliver signals representing the respective values of said parameter and of said quantity characteristic of the propagation of the acoustic waves. Moreover, the device comprises automatic control means which, upon reception of said signals, automatically actuates the driving means so as to equalize the respective values of said parameter measured for the different electrodes and to equalize the respective values of the quantity characteristic of the propagation of the acoustic waves measured at the different emitter-receivers.

The present invention can be utilized notably for the fastening of conduits other than in vertical position, which fastening does not benefit from the effect of gravity for maintaining parallel the axes of the two conduits. It becomes necessary to realize and maintain said parallelism by artificial means, and more particularly, at sea, by the placing of emissaries of great diameter, which will be most frequently two travelling cranes which, by means of a crossbar, sustain and guide the section of the conduit to connect to the extremity of the conduit already in place.

However, in order to realize said guidance, the images provided by television cameras, even an outline, or the indications of the divers, are ineffectual, when there is no visibility, to restore the relative position of the two extremities to be connected.

This is why it is necessary to provide a device specifically capable of determining in a continuous manner the relative position of said extremities and permitting in this manner the operator of the travelling crane to maneuver with certainty.

Throughout the body of the text the emitter-receivers can be called transducers.

The invention will be well understood and all its advantages will be made clearly apparent from the following description illustrated by the accompanying drawings wherein.

Figure 1:
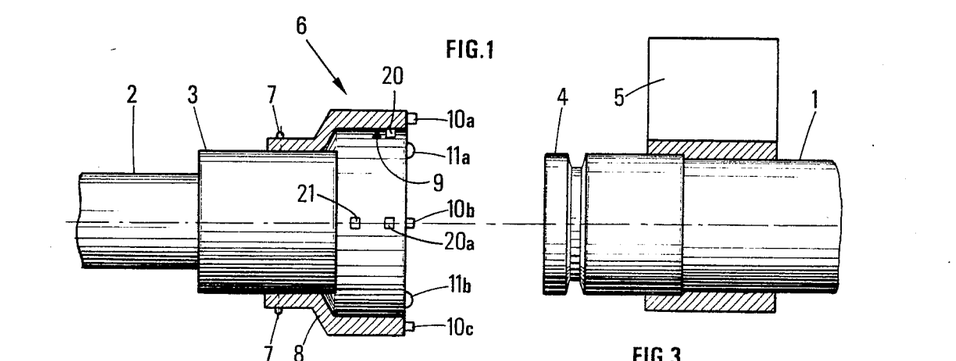
FIG. 1 diagrammatically shows the position detecting device according to the invention, used to effect the alignment of the axis of one pipe with that of an element to which the pipe is to be connected at the time of a first approach.

Hereinafter, reference will be made to the non-limitative example of use of the position detection system according to the invention, for assembling, on the sea-bottom, the end of a duct or pipe 1 with an element 2 resting on the water bottom, said assembling being effected by means of a coupling or connecting element of any known type, formed of two complementary members 3 and 4, one of which is rigidly secured to element 2 and the other to the end of pipe 1.

The element 2 may be, for example, a pipe or a stationary installation attached to the sea bottom or resting on the water bottom, such as an oil well head, a submerged reservoir, an oil manifold, etc. . .

The coupling will be effected either by a device manipulated from the surface such as from a travelling crane drivers, or by means of a remotely controlled robot or manipulator 5, equipped with propulsion means for displacing it through the water. This manipulator may be, for example, of the type described in the French Pat. No. 79 29655 filed on Dec. 3, 1979 and entitled "Dispositif commandable à distance d'intervention sur des structures immergees, notamment de raccordement de canalisation sous-marines".

Locating means, which may be of any known type, are associated with said manipulator and permit to position pipe 1 in such a manner that the distance between members 3 and 4 of the connector be close to a predetermined value D, for example on the order of 1.5 to 2 meters, these values being however not considered as limitative, and so that the angle formed between the members 3 and 4 be at most equal to a predetermined value $\alpha_O$ which, in practice, reaches 45°.

Figure 11:
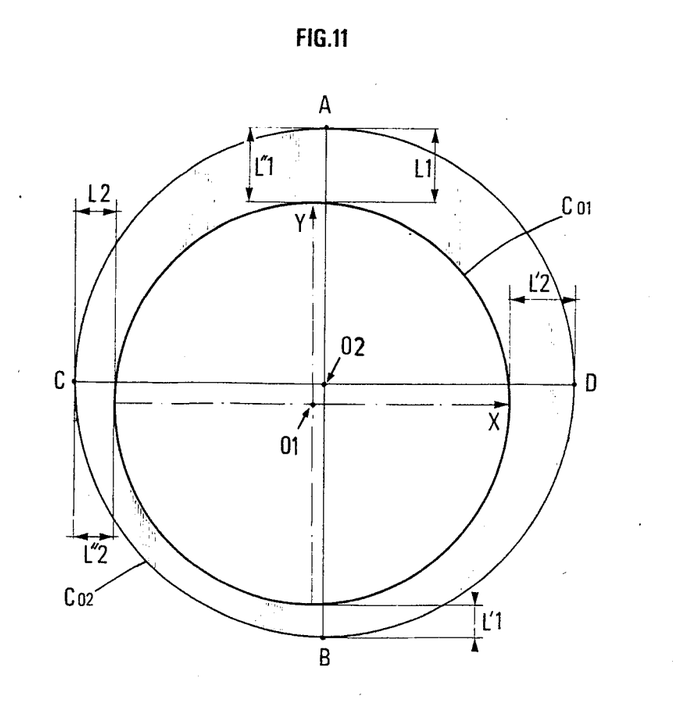
FIG. 11 illustrates schematically the positioning of two tubes.

Considering FIG. 11 in which there is shown two circles $C_{01}$ and $C_{02}$ of nonconcentric different diameters there is schematically illustrated the inner section of a plane through the two elements to be positioned.

Let us take in the circle in the center $0_2$ two points A and B diametrically opposed and on a diameter perpendicular to a diameter preceeding two other points C and D. On the diameter AB, L1 is the distance from point A to the circle in the center $0_1$ and $L'1$ is the distance from point B to said same circle.

Likewise, on the circle of diameter CD, L2 is the distance of point C to the circle of the center $0_1$ and $L'2$ is the distance from point D to the same circle.

By knowing the distances L1, $L'1$, L2, $L'2$, one can easily arrange the circles concentrically and eliminate the differences (L1−$L'1$) and (L2−$L'2$). Moreover, in addition, one can know the diameters of the circles of the center $0_1$ and $0_2$, the knowledge of the distances $L'1$ and $L'2$ being useless because theoretical distance L which one should have when the circles are concentrically arranged is known. It is sufficient to know the distances L1 and L2.

The latter can be easily measured if the circle of diameter $0_1$ is the cross-section of a tube and if one places at A and at C two transducers, or acoustic emitter-receivers. On measuring the transmission time of the ultrasonic waves between A and the tube and C and the tube, there is obtained, by knowing the speed of sound in water, the distances investigated. The error in parallax due to the fact that one measures solely L1 and L2 and not $L'1$ and $L'2$ are small when the diameter of a circle of radius $0_1$ is large in relation to the distances L1 and L2, and tend in any event toward zero when $0_2$ approaches $0_1$. The distances of $0_2$ along axes $0_1X$ and $0_1Y$ are also substantially equal to L1−L and to L2−L. In other words, one knows the coordinates of $0_2$ in a system of axis $X0_1Y$ connected to the first circle.

On disposing at least a second detector at a distance suitable to those placed at A and C and along the generatrices of the cylinder passing through A and C, one can thus obtain the coordinates in the system of axis $X0_1Y$ of a second point $0'2$.

The present invention can be utilized notably for connecting tubes of large diameter.

Figure 12:
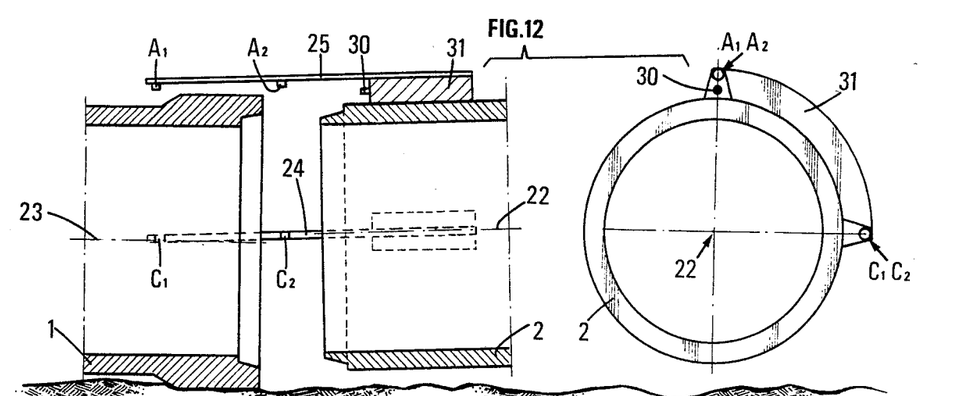
FIGS. 12 and 13 represent two different embodiments of the device according to the invention.

The drawing of FIG. 12 gives the principle of the device utilized.

Fixed to the tube of axis 22, to connect to tube of axis 23, already in place, a frame supports two measuring rods 24 and 25, to which there are fixed respectively two transducers A1, A2 and C1, C2. The measuring of distances L1, L2 and 1, 2 permits the alignment of the axes 22 and 23 before effecting the penetration.

The relative position of axes 22 and 23 can be seen on a CRT screen, a crosswire can determine by example the system of axis X01Y, with a solid cross-line representing a point 02 and a dashed cross-line representing a point 0'2.

The operator who conrols two travelling cranes, operates on the carriage and on the tackle in aligning successively 02 and 01, and 0'2 and 01 by successive steps, annuls X and also Y at first for 02 and for 0'2 and then, on returning to 02 until the three points 01, 02 and 0'2 are merged. The two axes 22 and 23 are also themselves merged. It is convenient to note that only three emitters-receivers can suffice to align the axes 22 and 23. One can in effect eliminate one of the measures L1, L2, 1 or 2.

The present invention can be utilized to effect connection of tube in downhole tubes.

In this case, it is not advisable to leave the transducers C1 and C2 on the edges of the tube and one should arrange them so that they are disposed preferrably in the interior of the two vertical planes 26 and 27 tangent thereto. In addition, the device described previously will be doubled for reasons for security. One will end with the device shown in FIG. 13.

A first device (FIG. 12) is composed of two rods 24 and 25 at 90° one to the other, as previously described, but one of them is at 30° to the left and the other at 60° to the right of the vertical plane passing through the axis of the tube or inversely.

Figure 13:
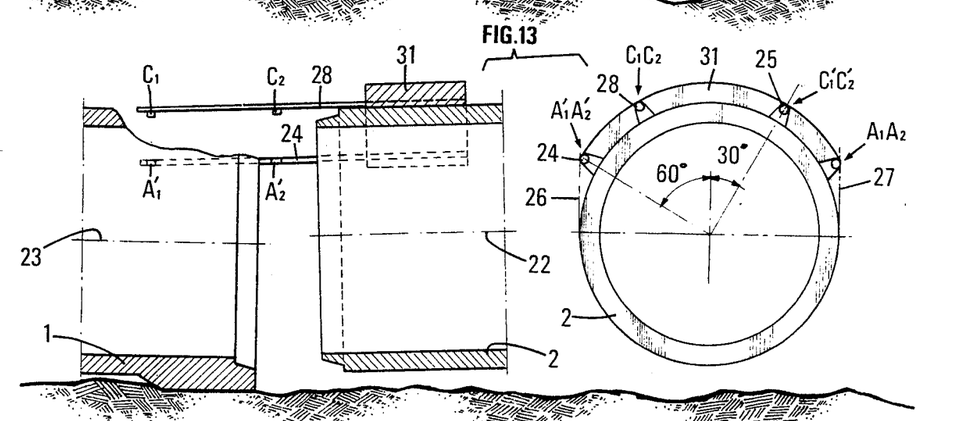

A second device comprises two supplementary rods 28 and 29 and is placed symetrically to the previous one for connecting to the same vertical plane. It is thus necessary to introduce a matrix of rotation of the axes because the horizontal movements and vertical ones imposed on tube are translated into the parallel displacements of the vertical and horizontal reference axes of the visualizing system.

One can add to the previously described devices at least one transducer 30 for measuring the distance given at each instant by means of a fixed vertical surface of the tube in place and of known position with respect to the horizontal distance of the tube and movement by reference to the fixed tube.

Well understood, each rod can be equipped with one of said transducers.

The measuring rods can be constituted by interchangeable elements, tubular, and of stainless steel comprising:

a transducer for measuring distance 30,
a male electric connector,
laterally, two transducers for measuring centering.

Each transducer can be constituted by a piezoelectric pellet resting on a metal body of stainless steel through the intermediary of a bed of absorbent material. The pellet is isolated from the ambient environment by a resin; the excitation signals and the return signals are transmitted by a coaxial cable either not connected at one part to the pellet or at the other part to the male electrical connector.

In a manner to avoid all entry of the water into the rod in the case of deterioration of one of the transducers, the rear portion thereof can be rendered sealed by the resin.

Each rod is fixed on the support 31 in a very precise manner and its positioning can be assured by two centering studs.

The connection can be constituted by a single cable grouping the three elementary cables in a manner to guarantee the integrity of the return signal. The single cable is armored and sheathed on its exterior. It is terminated at each extremity by an electric connector sealed with respect to the water.

The transducer 30 for measuring the distance 11 can be fixed at the extremity of a rod or more advantageously at the body 31.

Hereinafter, is another embodiment of the device according to the invention which can comprise a detection assembly-referenced 6 in FIG. 1 serving for a first approach. This device is rigidly secured to one of the elements to be assembled. In the case of FIG. 1, the detection assembly 6 is secured onto member 3 of the connector by any known means such, for example as by screws 7 or optionally by means making possible the recovery of said assembly after the assembling of the elements. The body 8 of this detection device has the shape of a crown whose inner bore 9 has a diameter larger than the external diameter of the elements of the connector 3-4. The body 8 is so arranged that its axis coincides with that of the member 3 of the connector.

The body 8 is equipped with a first network comprising at least three detectors 10 preferably regularly distributed over a circumference having its center on the axis of body 8.

In the case of FIG. 1, each network comprises four detectors placed at 90° from one another.

The detectors 10 of the first network consist for example of four electrodes 10a, 10b, 10c and 10d, electrically insulated from body 8.

Figure 1A:
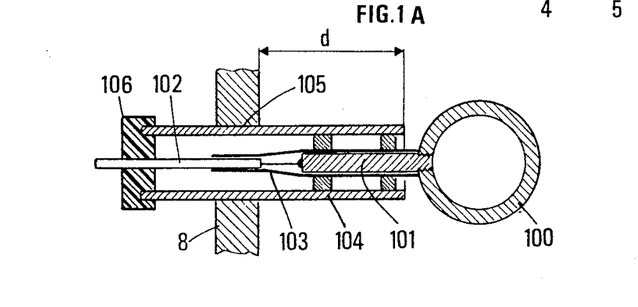
FIG. 1A illustrates an embodiment of the electrodes.

Figure 1A shows, merely by way of example, a particular embodiment of an electrode which has proved to be entirely satisfactory.

This electrode is formed of a hollow metal sphere 100 coated with a platinum layer. This sphere is secured, for example by means of a thread, to the end of a metal rod 101, electrically connected to a conductor 102 fed with a current source, not shown. The rod 101 is electrically insulated by means of a sheath 103 and placed in an insulating tube 104 secured onto the crown 8, for example by being forced into housing 105 provided therefor. The tightness of the tube is obtained by a joint 106, for example of silastene.

Figure 2:
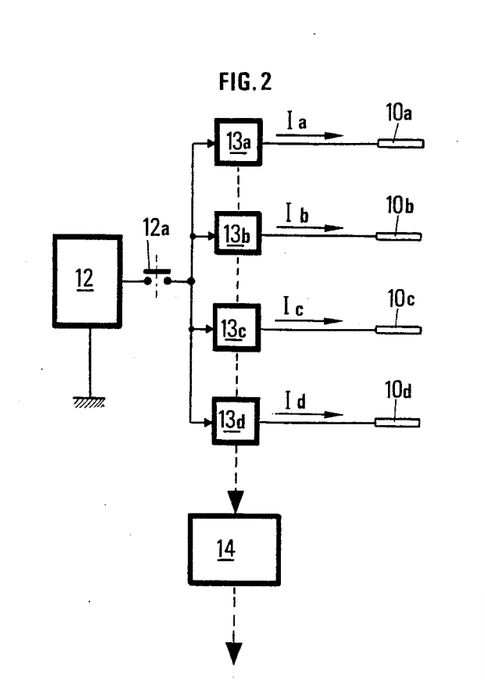
FIG. 2 illustrates the arrangement of an electrical locating network.

These electrodes 10a to 10d are connected to one of the terminals of an alternating or direct electric voltage source 12 (FIG. 2), through a control switch 12a, the other terminal of said source being grounded. Measuring members 13a to 13d determine the value of the electric current Ia, Ib, Ic and Id passing through the different electrodes. These measuring members 13a to 13b are adapted to deliver signals representing the values of the currents Ia to Id. These signals are transmitted to a circuit 14 which provides for the transmission of said signals in a known-per-se manner. The utility of these signals will be indicated hereinafter.

Figure 3:
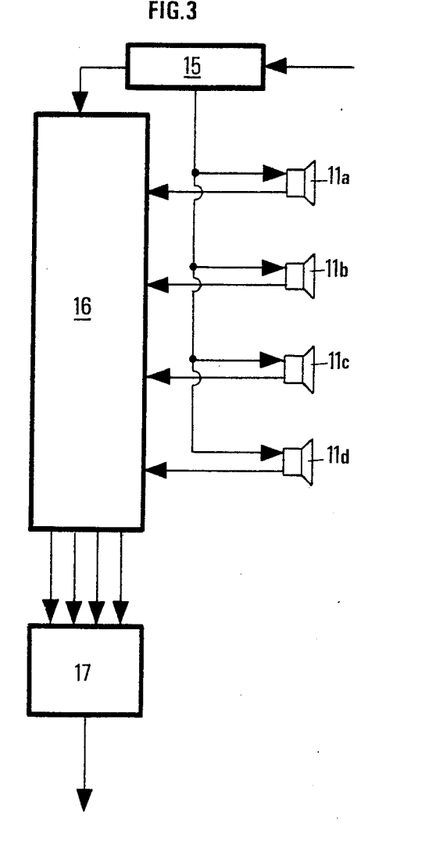
FIG. 3 shows the arrangement of an acoustic locating network used in combination with the electric network, FIGS. 4A to 4C diagrammatically show a mode of effecting the first approach phase.

The detectors of the second network are for example formed of four acoustic wave emitter-receivers, 11a, 11b, 11c and 11d (FIG. 3). These emitters are for example of the piezo-electric type.

Upon reception of an electric signal generated by a control circuit 15, for example remotely controlled, each emitter-receiver emits an acoustic wave train and, upon reception of an acoustic wave, each receiver generates an electric signal transmitted to a processing circuit 16 synchronized with the control circuit 15.

This processing circuit, whose design can be effected by anyone skilled in the art (see for example, IBM Technical Disclosure Bulletin Vol. 18 No. 8, January 1976), elaborates for each emitter-receiver a signal representing the time interval between the emission and the reception of the acoustic wave. A circuit 17 effects the transmission of said signal in a known-per-se manner.

Of course, the acoustic signals may be characteristic of the emitter-receiver from which they are produced, said characteristic being for example, the frequency, a particular coding of the pulses forming the acoustic wave train, etc. . .

The emission diagrams of the emitters-receivers are so selected that said emitters-receivers may operate as indicated hereinafter.

Figure 4A:
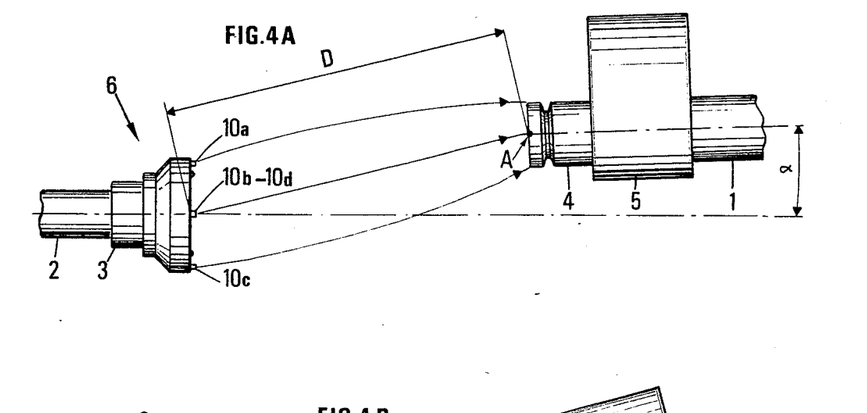
Figure 4B:
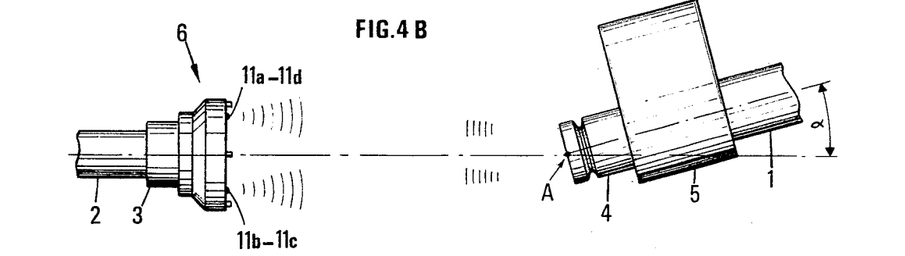
Figure 4C:
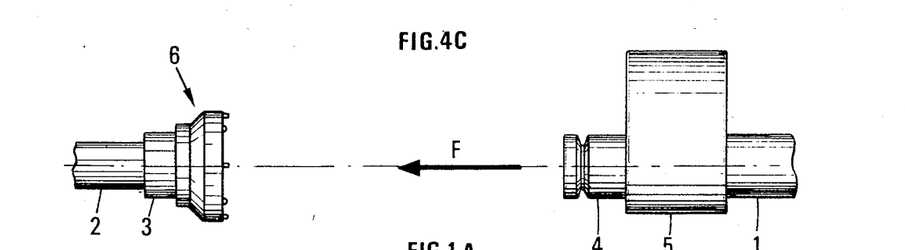

FIGS. 4A to 4C diagrammatically illustrate the carrying out of the invention.

First of all, by remote control of the manipulator 5, the end 4 of pipe 1 is brought closer to the end of member 3 (FIG. 4A), to a determined distance D there-from or to a distance less than D. This distance is, for example, of about 1.5 to 2 m. The axis of pipe 1 thus forms with the axis of element 2 an angle $\alpha$ at most equal to a determined value $\alpha_O$.

The member 4 is maintained at the electric potential of the ground. The electrodes 10a to 10d are connected to the electric voltage source 12 by acting on switch 12a. An electric current then flows between each electrode 10a to 10d and the member 4. The currents Ia, Ib, Ic and Id are measured. Then the manipulator 5 is actuated so that said different electric currents become substantially equal. At this instant, the center of the end part of member 4 is substantially located on the axis of element 2 (FIG. 4B). Otherwise stated, the axes of elements 1 and 2 have an intersection point A at the end of member 4.

At said instant, the acoustic detectors network is actuated. Each emitter-receiver emits an acoustic signal which is reflected on the end face of member 4 perpendicular to the axis of said member. For each emitter-receiver, the time interval between the transmission and the reception of the acousitc wave is measured and the manipulator 5 is actuated so that these time intervals become substantially equal. When these conditions are fulfilled, the axis of element 1 substantially coincides with the axis of element 2 (FIG. 4C). It may be necessary to repeat several times at least one of the preceding operations up to the achievement of a satisfactory alignment.

The manipulator is actuated for displacing the pipe 1 in the direction of the arrow F so that, at each instant, the above-mentioned conditions are fulfilled, i.e. that, simultaneously, the electric circuits emitted respectively by electrodes 10a and 10d remain substantially equal and the travel times of the acoustic waves between the respective emitters and the end of member 4 remain substantially in identical to each other.

As it is apparent from the above-description the emission diagram of the acoustic emitters-receivers along a direction substantially parallel to the axis of connector member 3, must permit the reflection of the acoustic waves until the end part of member 4 be substantially in the plane of the emitters. The final fitting of members 3 and 4 of the connector will be made more easy by designing the latter with complementary shapes comprising at least one surface of revolution, for example a conical surface.

Figure 5:
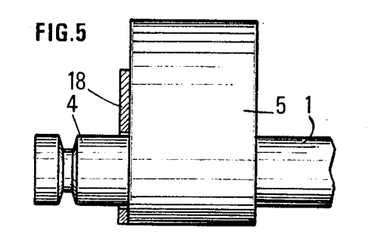
FIG. 5 shows an alternative embodiment of a manipulator according to the invention.

The positioning of member 4 may be better controlled by making use of a plane plate 18 for reflecting the acoustic waves, secured for example to the manipulator 5, perpendicularly to the axis of element 2 (FIG. 5) in association with emitters-receivers having directional emission diagrams.

The transmission of the signals from the transmission devices 14 and 17, may be effected by cable or advantageously in the form of coded acoustic wave trains, thus avoiding any material connection.

This transmission may be effected towards the surface where the value of the signals may be displayed and can be used as information by the operator which remotely controls the manipulator 5.

However, according to a particular embodiment, the transmission means 14 and 17 provide for an acoustic transmission of the information towards a receiver carried by the manipulator 5. Control circuits, connected to the receiver and which can be designed by those skilled in the art, automatically actuate the driving means for moving the manipulator 5 so as to maintain the axes of elements 1 and 2 in alignment during the phase of bringing these elements closer to each other.

Of course, the device 6 may also be rigidly secured to the member 4 or to the manipulator 5.

In the tests the alignment of the axes were maintained within the following limits:

angle formed between the axes of elements 1 and 2 lower than 3°, distance between the axes lower than 1 cm.

The accurate alignment of the axes of elements 1 and 2 at the moment of their connection is obtained by the use of a device for precise positioning.

Figure 6:
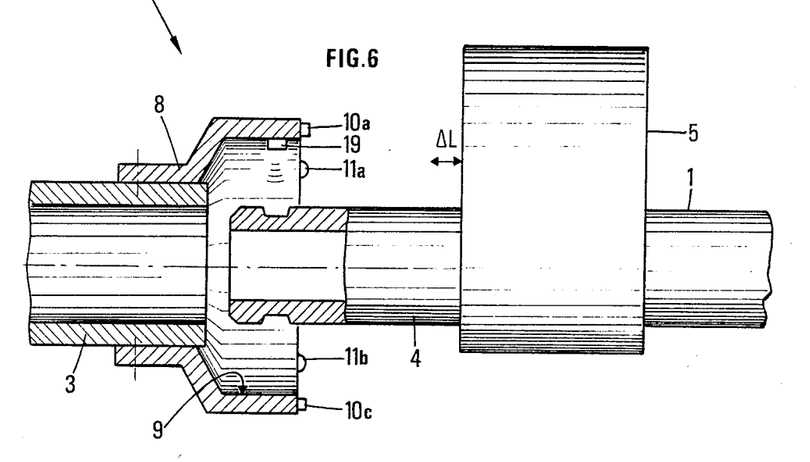
FIG. 6 illustrates a device for precise positioning of the conduit according to the invention.
Figure 7:
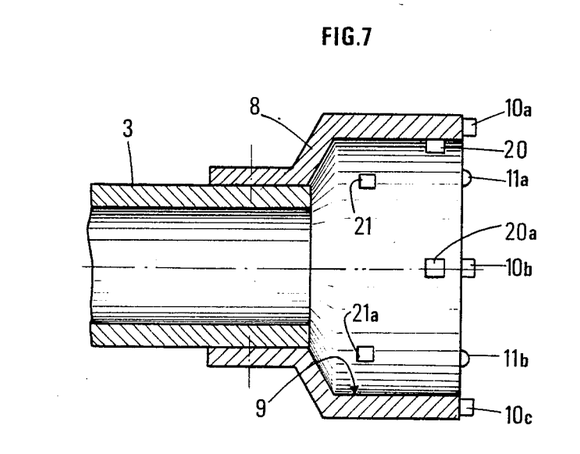
FIG. 7 shows an alternative embodiment of the device for precise positioning.

This device is illustrated schematically in FIGS. 6 and 7. It comprises at least two emitters-receivers of the acoustic type 20 and 20a disposed in the bore 9 of body 8 and in a plane substantially perpendicular to the axis of member 3 of the connector as well as to a third emitter-receiver 21 situated in another plane. The emitters-receivers emit radially.

The two first emitters-receivers are not aligned at a point on the axis of member 3.

For a position of member 4, there is measured at that time for each emitter-receiver the time interval separating the emission of the acoustic wave from the reception of the reflected acoustic wave, and, after an axial displacement L of member 4, the measurements are repeated and the position of the member 3 is modified so that the times measured by all the emitters-receivers conform to predetermined values corresponding to the suggested positioning of members 3 and 4, that is to say for bringing the axes of members 3 and 4 coincident to each other.

In another embodiment, the device for precise positioning comprises a fourth emitter-receiver 21A disposed in the bore 9 of body 8 and emitting radially from a plane perpendicular to the axis of member 3 and containing the third emitter-receiver 21. In this manner, one of the pairs is located in a first perpendicular plane to the axis of member 3 and the second pair is placed in a second plane perpendicular to said same axis. The two pairs are located in radially different planes. Under these conditions, alignment of the axes of members 3 and 4 can be achieved by measuring for each emitter-receiver the time interval separating the emission of the acoustic wave from the reception of the reflected acoustic wave and in modifying the position of member 3 so that the intervals of times are equal between one and the other and equal to a predetermined value.

It is well evident that if the emitters-receiver are not situated at an equal distance from the axis of the member 3 the intervals of time separating emission of the acoustic wave from the predetermined times will be different. In a general manner the predetermined interval of times are determined as a function of the shape of the member to be positioned and of the localization of the emitters-receiver with reference to said members.

Modifications may be brought without necessarily departing from the scope of the present invention. As a matter of fact, in the preceding description, the assembling of members 3 and 4, having the shape of surfaces of revolutions centered on the axes which must be aligned, have been considered.

When this is not the case, it would be easy to associate with member 4 electrodes judiciously distributed about the axis of said member, these electrodes being maintained at the same electric potential different from that applied to electrodes 10a to 10d.

As a general rule, the electrodes and the acoustic members associated with one of the elements are arranged according to a geometrical configuration determining at least one point of the axis of said element, the measured quantities relating to the electric currents and to the propagation of the acoustic waves taking predetermined values in relation with the geometrical configurations, when the axes of the two elements are in alignment.

Moreover, the distribution of the electrodes or the acoustic members about the axes of the element with which they are associated, may be judiciously selected, not only to provide for the alignment of the axes of the two elements, but also to provide for a determined relative positioning of said elements about the alignment axis.

In the above description, it has been stated that the electric current emitted by the electrodes 10a . . . is measured. As a general rule, there is measured a quantity relating to the electric current, such, for example, as the voltage of the electrodes, the electric resistance between the electrodes 10a . . . and the member 4 etc. .

By way of example, a device according to the invention has been designed with four electrodes 10a, 10b, 10c, 10d arranged on the crown 8 and diametrically opposite by pairs.

Figure 8:
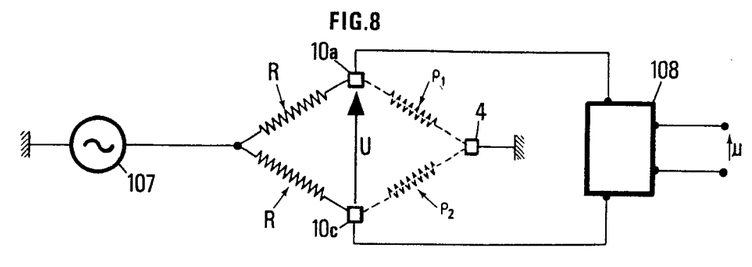
FIG. 8 illustrates an example of one embodiment of an electrical circuit permitting effecting of the first approach phase.

The detection was effected by associating the electrodes by pairs as shown in FIG. 8. The two electrodes 10a and 10c were fed parallelly from an alternating current source 107 through two resistors of equal resistance R. The currents emitted by the electrodes 10a and 10b, circulated back to member 4. The resistances $P_1$ and $P_2$ between the member 4 and the electrodes 10a and 10c formed with the resistors R a Wheatstone bridge.

The interelectrode voltage U thus represented the position of the member 4 with respect to the electrodes and was nullified when the center of member 4 was placed on the mediatrix of the segment delimited by the two electrodes. This voltage, processed in an alternating/direct current converter 108 which delivered a voltage, made it possible to visualize the position of member 4 on a cathodic screen.

In the examples illustrated in the preceding figures, the detection assembly 6 is carried by that one of the members to be assembled which is stationary. Of course, it would not be outside the scope of the invention, to fasten the device 6 onto the movable member 4.

Figure 9:
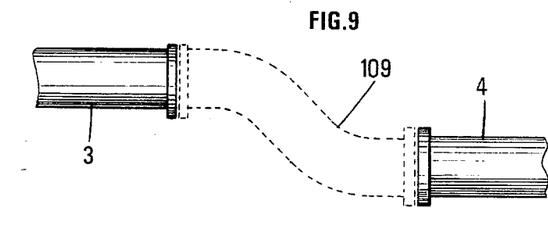
FIGS. 9 and 10 show another use of the device according to the invention.

In the above description it has been admitted that the end of one of the elements to be assembled was movable so as to effect the connection of the two elements. In practice, this is not always possible as a consequence of the weight and the size of these elements. For example, after immersion on the sea bottom, it is difficult to displace, with respect to each other, the two ends of two pipe sections of very great length. Often, after immersion, the ends of two sections 3 and 4 (FIG. 9), are close to each other, but cannot be directly connected. There is then used an intermediary connector 109, shown in dashed line on FIG. 9. This connector is often called "sleeve connector" and is specially designed at the proper size after a diver has identified the relative position of the end of the elements 3 and 4 with the aid of a gauge.

By the present invention, the intervention of the diver can be avoided and accordingly, this connecting method can be used even at great depth, where the intervention of divers is not possible.

For this purpose the device 6 according to the invention is associated with a moving member 110 of any known type and whose position may be determined at every instant with accuracy with respect to a reference system.

Figure 10:
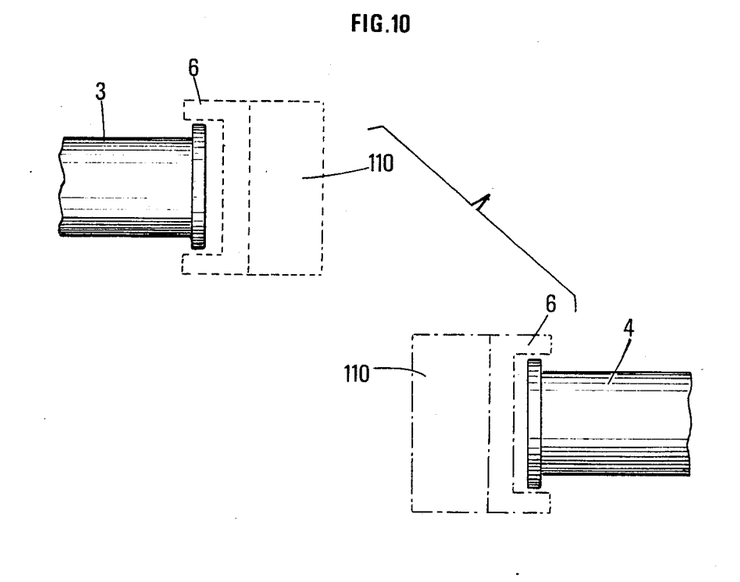

Thus, as shown in FIG. 10, member 110 is moved, as previously indicated, so that the device 6 according to the invention is positioned at the end of element 3 as shown in mixed line in FIG. 10. The position of member 110 is then located with respect to the reference system, said position being representative of the end of member 3 in the reference system.

Then the member 110 is moved so that the device 6 is placed at the end of member 4 (position diagrammatically shown in dashed line in FIG. 10). The new position of member 110 is then located in the reference system, said new position being representative of the end of element 4 in said reference system.

It is then easy to manufacture a new sleeve connector 109 adapted to connect the two elements 3 and 4. This sleeve connector may also be positioned for example by a manipulator robot, not shown.

We claim:

1. A device for permitting the relatively precise positioning of two geometrical axes respectively of two elements at least one of the elements being associated with means capable of assuring its displacement characterized in that it comprises in combination at least two acoustic emitters-receivers disposed in a first plane substantially perpendicular to one of said geometrical axes, said axis being defined as the first axis, and capable of emitting toward said axis, said two emitter-receivers not being located on a same line passing through said first axis and in that it comprises a third emitter-receiver situated outside of said plane.

2. A device according to claim 1 characterized in that it comprises a fourth emitter-receiver situated substantially on a second plane perpendicular to said first axis and passing through the third emitter-receiver.

3. A device according to one of claims 1 or 2 characterized in that at least one of said emitter-receivers is disposed on a rod attached to one of said elements.

4. A device according to one of claims 1 or 2 wherein said element having the first geometrical axis is shaped as a cylinder of revolution whose axis of revolution is the same as said first axis characterized in that the assembly of said emitters-receivers is comprised at the interior of the space defined by said element of cylindrical shape and two planes vertically tangent to said cylinder.

5. A device according to claim 1 permitting a first phase of approach which is not precise in the case wherein said two elements are placed in a conducting liquid medium, and in that it comprises in addition:

- a first assembly of electrodes rigidly secured to a first of said elements and arranged according to a geometrical configuration whereby at least one point of the axis of said element can be defined,
- a second assembly of electrodes, rigidly secured to the second element and arranged according to the geometrical configuration whereby at least one point of the axis of said element can be defined,
- a source of electric voltage having one output terminal electrically connected to the electrodes of one of the assemblies and the other output terminal electrically connected to the electrode of the other assembly,
- means for measuring the values of a parameter in relation with the electric currents passing through the electrodes of one of the assemblies,
- a first group of acoustic members rigidly secured to one of the elements, arranged according to a geometrical configuration permitting defining at least one point of the axis of said element,
- a second group of acoustic members ridigly secured to the other element, arranged according to a geometrical configuration permitting defining at least one point of the axis said element, the acoustic members of at least one of said groups being adapted to emit acoustic waves, and
- means for measuring a quantity characteristic of the propagation of the acoustic waves between the acoustic members of the two groups.

6. A device according to claim 5, characterized in that the means for measuring the values of said parameter in relation with the electric currents and the means for measuring the quantity characteristic of the propagation of the acoustic waves are adapted to deliver signals representative of the respective values of said parameter and of said quantity characteristic of the propagation of the acoustic waves, and in that it comprises automatic control means which, upon reception of said signals, automatically actuate moving means for equalizing the respective values of said parameter measured for the different electrodes and for equalizing the respective values of the quantity characteristic of the propagation of the acoustic waves measured at the different emitters-receivers.

7. A device according to claim 5, characterized in that each electrode assembly comprises at least three electrodes regularly distributed over a circumference centered on the axis of the element to which said electrodes are rigidly secured and perpendicular thereto.

8. A device according to claim 5, wherein one of the ends of the second element has a shape of a surface of revolution about its axis and is electrically conducting, characterized in that said first end replaces said second electrode assembly and in that the first electrodes assembly comprises at least three electrodes regularly distributed over a circumference perpendicular to the axis of the first element and centered on said axis.

9. A device according to claim 5, characterized in that the acoustic members of one of the groups are constituted by at least three acoustic wave emitters-receivers, regularly distributed over a circumference centered on the axis of the element to which are rigidly secured said acoustic members and perpendicular to said axis, and in that said emitters-receivers emit acoustic waves in a direction substantially parallel to the axis of said element.

10. A device according to claim 9, characterized in that the group of acoustic members of the other element is constituted by an acoustically reflecting surface, placed perpendicularly to the axis of the element to which it is secured and in that the quantity characteristic of the propagation of the acoustic waves is the time interval separating the emission of the acoustic waves from their reception by said emitters-receivers after reflection on said reflecting surface.

11. A device according to claim 9, characterized in that said reflecting surface is the front face of the corresponding element.

12. A device according to claims 8 or 10, characterized in that it comprises a body of annular shape, ridigly secured to the first element, and in that said electrodes and said emitters-receivers are carried by said body and distributed over a same circumference.

* * * * *